United States Patent [19]

Turco

[11] 4,301,506
[45] Nov. 17, 1981

[54] AUTO ROUTING COMPUTER FOR ELIMINATING THE NEED FOR MAPS OR TRAVEL INSTRUCTIONS

[76] Inventor: Daniel J. Turco, 409 Boston Rd., Billerica, Mass. 01821

[21] Appl. No.: 166,648

[22] Filed: Jul. 7, 1980

[51] Int. Cl.³ .................................. G06F 15/50
[52] U.S. Cl. .............................. 364/436; 364/444
[58] Field of Search .............. 364/424, 436, 439, 441, 364/444, 446, 449; 340/52 R, 54; 235/92 DN, 92 TC; 73/178 R; 455/11, 54

[56] References Cited

U.S. PATENT DOCUMENTS

| 2,646,924 | 7/1953 | Schuck | 364/446 |
| 3,845,289 | 10/1974 | French | 364/436 |
| 3,876,980 | 4/1975 | Haemmig et al. | 371/69 |
| 3,925,641 | 12/1975 | Kashio | 364/424 |
| 4,190,819 | 2/1980 | Burgyan | 364/449 |

OTHER PUBLICATIONS

Rosen et al., "An Electronic Route-Guidance System for Highway Vehicles", IEEE Trans. on Vehicular Tech., vol. VT-19, No. 1, Feb. 1970, pp. 143-152.
French et al., "Automatic Route Control System", IEEE Trans. on Vehicular Tech., vol. VT-22, No. 2, May 1973, pp. 36-41.

*Primary Examiner*—Errol A. Krass
*Attorney, Agent, or Firm*—Robert L. Nathans

[57] ABSTRACT

A routing computer is provided for eliminating the use of maps or oral or written instructions by the operator of a vehicle who wishes to travel from a given point of origin over a selected route terminating in an ultimate destination, such computer including a keyboard for instructing a data processor that the driver wishes to travel over an often unknown route between a known point of origin and a known ultimate destination. The data processor produces one selected set of data corresponding to the unique selected route, which set of data includes a plurality of data subsets, each of which produces a visual indication of the various subroutes to be taken while the vehicle traverses the journey. The data processor also produces indications of the estimated time that remains before the vehicle reaches the ultimate destination, and the estimated miles to go. Circuitry is also provided for causing the computer to indicate alternate recommended routes in the event of a traffic tieup. The processor may be reprogrammed to change the geographical area within which the vehicle is travelling. The result is the saving of time, gasoline and operator aggravation.

4 Claims, 3 Drawing Figures

AUTO ROUTING COMPUTER FOR ELIMINATING THE NEED FOR MAPS OR TRAVEL INSTRUCTIONS

BACKGROUND OF THE INVENTION

Numerous drivers find it difficult to employ a map in journeying through a particular route, which is often unknown to them. Oral instructions from another individual also must be written down or remembered. These approaches are inefficient, are wasteful of valuable time and gasoline due to driving errors, are aggravating to the driver, and increase the risk of accidents due to the need to refer to a map or written instructions. Furthermore, traffic tieups due to accidents, rush hour driving, or adverse weather conditions further waste time and gasoline due to the arrested movement of automobiles.

Accordingly, it is an object of the present invention to overcome the above stated problems by providing a vehicle mounted computer, e.g., mounted on the vehicle dashboard, which is simple to operate, and which sequentially indicates to the driver directions, or alternate directions, to aid him in traveling over a plurality of subroutes which are traversed, one after the other, to take him to the ultimate destination without the use of the aforesaid maps or instructions. Indications of remaining time and mileage to reach the ultimate destination are also provided.

SUMMARY OF PREFERRED EMBODIMENTS OF THE INVENTION

In accordance with one aspect of the invention, a data input device, preferably a keyboard, is employed to inform the computer of the identity of the point of origin and the identity of the ultimate destination of the overall route, without the need to inform the computer as to the often unknown steps required to traverse the total route. The computer thereafter produces an indication on a visual display which informs the operator as to how to traverse the first subroute. Upon arriving at the end of the first subroute, the operator actuates a key, instructing the data processor to fetch the next subroute, which is thereafter displayed on the screen, and so on, until the operator arrives at the ultimate destination. Should the operator desire to drive in a completely different geographical area, the data processor may be reprogrammed through the use of, for example, a magnetic tape cassette associated with such geographical area.

Other objects, features, and advantages of the present invention will become apparent upon the perusal of the following detailed description taken in conjunction with the drawings in which:

FIGS. 1 and 2 schematically illustrate the overall operation of the preferred embodiment; and FIG. 3 illustrates the embodiment of the invention in greater detail.

DETAILED DESCRIPTION

Figure 1:
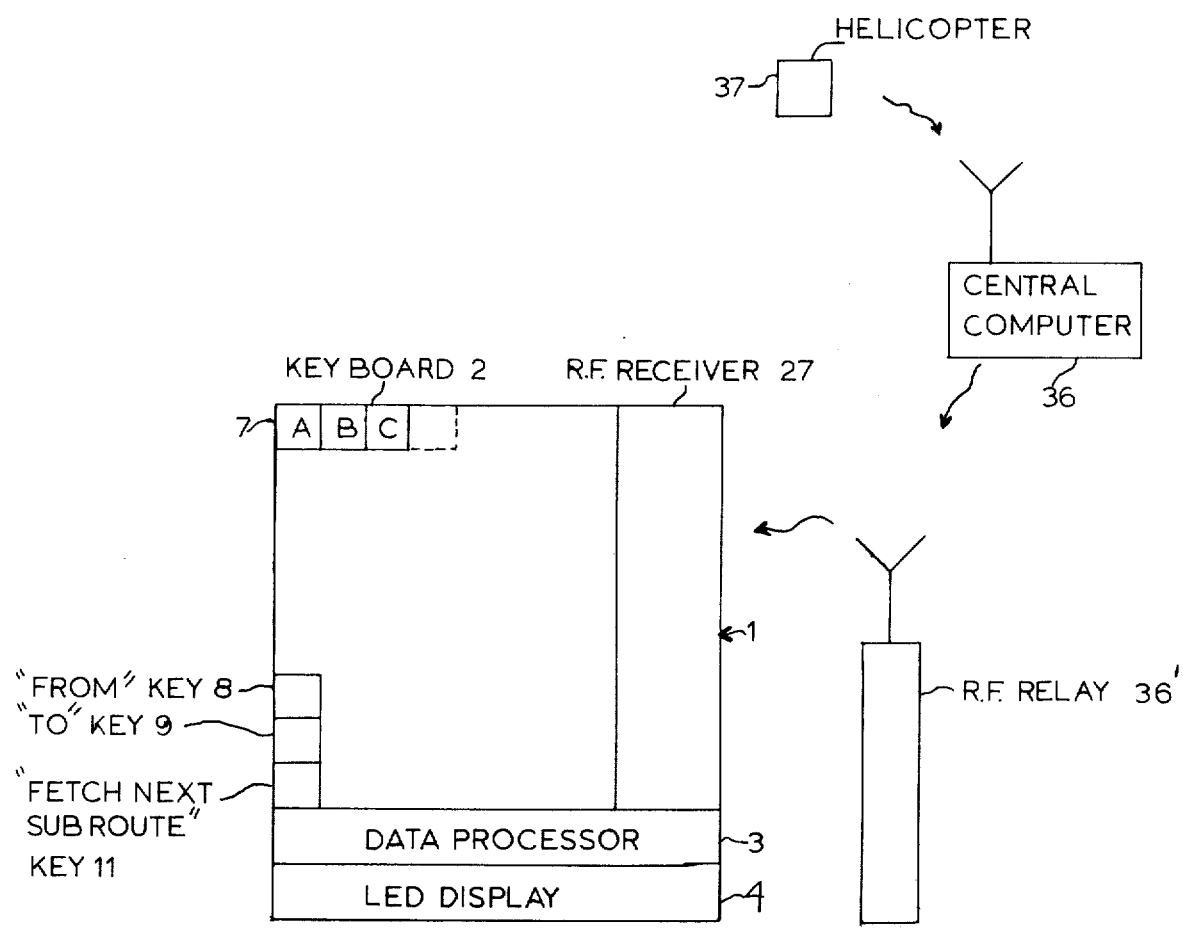

In FIG. 1, computer 1 is schematically illustrated, which comprises keyboard 2, data processor 3, and visual display subunit 4 which preferably employs light emitting diodes (LEDS). Keyboard 2 includes letter keys 7, a "from" key 8, and a "to" key 9, together with a "fetch next subroute" key 11.

Figure 2:
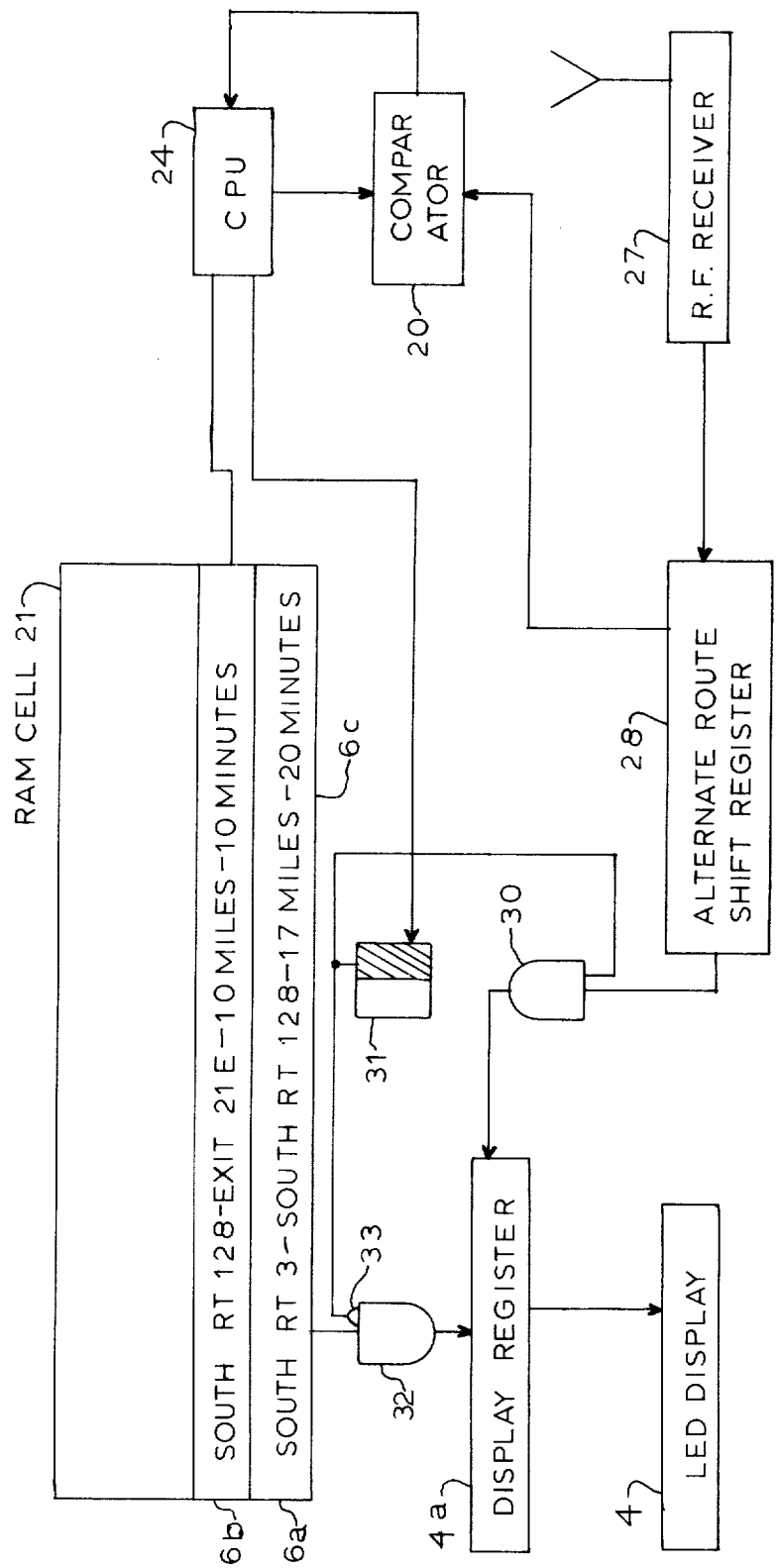

Now let it be assumed that the driver wishes to drive from Billerica, Mass., to Waltham, Mass. The "from" key 8 is actuated, and the name of the point of origin, namely "Billerica", is generated by sequentially actuating the letter keys. The "to" key 9 is thereafter actuated, and "Waltham", the point of ultimate destination, is encoded in like manner. The first subroute instruction 6a in FIG. 2 will be displayed by LED display 4 and will inform the operator to proceed south on Route 3 and south when the vehicle arrives at Route 128. Upon arriving at the intersection of Route 3 and Route 128, the "fetch next subroute" key 11 is actuated, which causes the data processor to control the display to visually produce the next subroute instruction (6b) namely: proceed south on Route 128 to Exit 21E.

Figure 3:
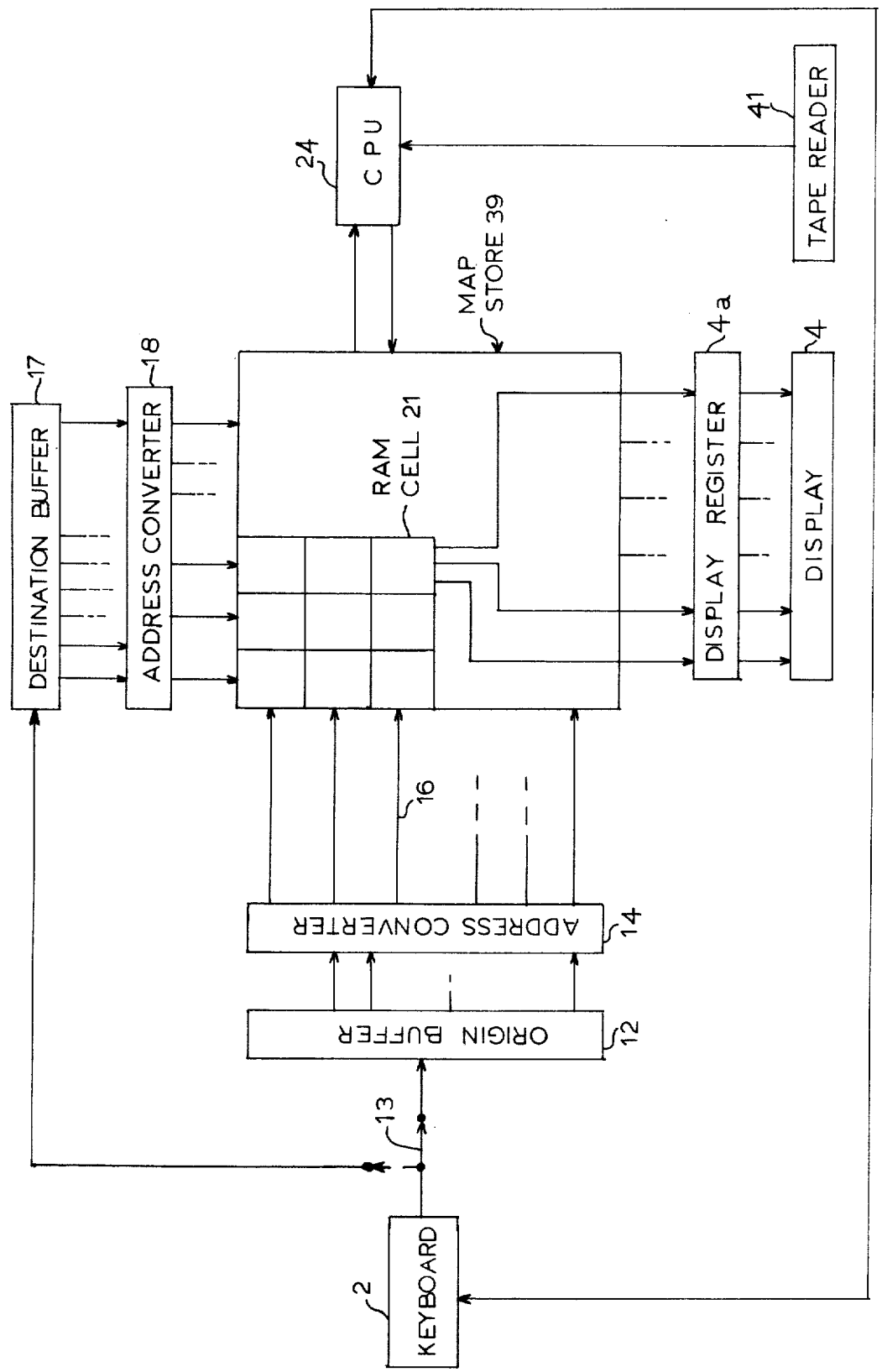

While numerous electronic designs may obviously be employed to execute the foregoing, an array or matrix of random access memory cells (RAMS) is illustrated in FIG. 3 in order to clearly illustrate the principles of the invention. In FIG. 3, origin buffer store 12 is coupled to keyboard 2 via switch 13 during the inputting of binary codes representative of "Billerica". Such binary codes cause address code converter 14 to mark one of a large number of horizontal leads such as lead 16. The actuation of "to" key 9 in turn causes the keyboard to be coupled to destination buffer store 17 via switch 13, and in like manner, address converter 18 energizes one of a plurality of vertical leads such as 19. As a result, one of a large plurality of RAM cells such as 21 is enabled by virtue of AND gates or other well known cross point positioned threshold devices. The binary data subset previously written into RAM cell 21 at 6a, is in turn employed to energize the LED elements to display the instruction as to how to traverse the first subroute. For example, in FIG. 2, the first instruction would be as indicated in the Figure at 6a. Of course, translation circuitry for converting such binary data to energize the various LED elements is well known to those skilled in the art. See for example the electronic wristwatch art. RAM cell 21 will further contain the mileage between Billerica and Waltham along with the estimated time of travel, and such data may also be visually indicated at portion 6c in FIG. 2. When the operator arrives at the intersection of Route 3 and Route 128, "fetch next subroute" key 11 is actuated by the operator, which causes the second subset of binary data at 6b to be transmitted from the addressed RAM cell and inserted in display register 4a, which is cleared of the previously stored first subset of data. The LED display 4 now displays the directions as to how to traverse the second subroute. The actuation of key 11, besides "roll calling" the instructions for display, also causes the 17-mile indication shown at 6c to be reduced to 10 miles, as the RAM contains the information that it is 6 miles to the end of the first subroute, namely the intersection of Route 3 and Route 128. The procedure is similar with respect to the estimated time. Upon arriving at the end of the second subroute (Exit 21E) the ultimate destination has been reached.

Details of the interaction of CPU 24 with the registers, gates, keyboard 2 and switch 13 are not illustrated in the interest of clarity, brevity, and economy as it is well within the skill of the art to perform the various roll call functions, RAM cell selection functions, buffer register erase and clearing functions, and the aforesaid mileage and minute subtraction functions. Numerous variations may be made in the described embodiment of the invention as indicated by "What Each Engineer Should Know About Microcomputers," by William S.

Bennett and Carl F. Evert, Copyright 1980, by Marcel Dekker, Inc.

Now let it be assumed that helicopter 37 of FIG. 1, flying over the greater Boston area, signals central computer 36 that a severe traffic tieup is occurring on Route 128 between the intersection of Routes 3 and 128 and the Waltham exit. The central computer transmits a coded RF signal to one of a number of RF relays 36' which are scattered about the greater Boston area. These signals are detected and demodulated by RF receiver 27 and are inserted into the alternate route shift register 28 illustrated in FIG. 2. CPU 24 addresses comparator 20 with binary data indicating that enabled RAM cell 21 will next cause the data at 6b in FIG. 2 to be inserted into the display register 4a. The coded signal in register 28 will also apply binary data to comparator 20 indicating that the tieup relates to the second subroute next to be displayed. As a result, flip-flop 31 is actuated to inhibit gate 32 and enable gate 30, and as a result, no visual indication of the information shown at 6b will be displayed. However, since this action enables AND gate 30 which is normally disabled, the alternate route will be displayed. Of course, receiver 27 will often receive coded data relating to tieups in areas which have nothing to do with the data in the enabled RAM cell 21. In this case, comparator 20 does not generate an output signal to produce the above stated effect. The details of the transfer of information from the helicopter to receiver 27 via central computer 36 and RF relay beacon 36' have been omitted since the encoding of this information and the modulation of the RF signal are all well within the skill of the art.

Accordingly, it may now be seen that detour or alternate routes may be displayed in order to save valuable time, aggravation, and gasoline.

Now let it be assumed that the operator, who could be a salesman, has to make a number of calls in the Providence, Rhode Island area instead of the greater Boston area. On his way to Providence, he would perform a simple step to reprogram the array of RAM cells of map store 39 to accommodate a completely different set of points of origin and points of ultimate destination. A "Providence" cassette tape would be read by reader 41 of FIG. 3, and CPU 24 would rewrite fresh binary data into the map store 39. The operation would be carried out as before. Should an individual, such as a salesman, have business in numerous areas, an appropriate set of the above mentioned cassettes could be employed.

Thus, in summary, savings in time and gasoline and increased safety are all obtainable by providing the subject computer, which guides the operator of the vehicle step by step between a known point of origin and a known ultimate destination. Driver aggravation is also reduced.

It is understood that the scope of the invention is only to be restricted by a fair reading of the following claims and equivalents to portions thereof, and that the invention need not be limited to the arrangement suggested above. For example, display 4 could take many other forms, such as liquid crystal devices and even audible voice recodings, and while the input device is preferably a keyboard, other devices may be utilized, such as telephone dials, etc. A plurality of map stores, one for each area, may be provided and electrical switching devices may be employed to select a particular geographical area in place of the above mentioned tape reader for erasing the contents of one map store.

I claim:
1. A method of eliminating the use of maps or other instructions by the operator of a motor vehicle who wishes to travel from a given point of origin over a selected route terminating at a point of ultimate destination comprising:
   A. providing a data processor completely contained within said motor vehicle for generating a given plurality of sets of data, each set representing a particular route within a given geographical area and each set including a plurality of data subsets, each subset including data indicative of a particular subroute to be taken in traversing said particular route, said data processor further including:
      a1. a manually operated route establishing input device for generating data indicative of the point of origin and the point of ultimate destination of said selected route;
      a2. selection means responsive to the manual actuation of said route establishing input device for selecting a particular selected set of said sets of data and for enabling the sequential generation of said plurality of data subsets making up said particular selected set of data;
      a3. a manually operated fetch next subroute input device for instructing said data processor to fetch the next data subset indicative of the next subroute, of said selected set of said sets of data;
      a4. output means responsive to the manual actuation of said fetch next subroute input device and the resulting generation of said next data subset for indicating to said operator the next subroute to be taken;
   B. manually actuating said route establishing input device to enable the generation of a plurality of data subsets of said selected data set;
   C. manually actuating said fetch next subroute input device upon the arrival of said motor vehicle at the point of origin of the next subroute for causing said output means to indicate to said operator the next subroute; and,
   D. manually actuating for a second time said fetch next subroute input device upon the arrival of said vehicle at the point of origin of the following subroute and so on until said motor vehicle arrives at said ultimate destination.

2. The method of claim 1 further including the step of recording within said data processor a second plurality of sets of data, different from said given plurality of sets of data, each set of said second plurality of sets of data representing a particular route within a second geographical area different from said given geographical area for enabling the routing of said motor vehicle within said second geographical area.

3. A method of eliminating the use of maps or other instructions by the operator of a motor vehicle who wishes to travel from a given point of origin over a selected route terminating at a point of ultimate destination comprising:
   a. providing a data processor completely contained within said motor vehicle for storing therein a given plurality of sets of data, each set representing a particular route within a given geographical area and each set including a plurality of data subsets, each subset including data indicative of a particular subroute to be taken in traversing said particular route, said data processor further including:

a1. a first manually operated input device for generating data representing the point of origin of said selected route;

a2. a second manually operated input device for generating data representing said ultimate destination;

a3. selection means responsive to the manual actuation of said first and second input devices for selecting a particular selected set of said sets of data and for enabling the sequential generation of said plurality of data subsets making up said particular selected set of data;

a4. a third manually operated input device for instructing said data processor to fetch the next data subset indicative of the next subroute, of said selected set of said sets of data;

a5. output means responsive to the manual actuation of said third input device and the resulting generation of said next data subset for indicating to said operator the next subroute to be taken;

b. manually actuating said first and second input devices to enable the generation of a plurality of data subsets of said selected data set;

c. manually actuating said third input device upon the arrival of said vehicle at the point of origin of the next subroute for causing said output means to indicate to said operator the next subroute; and d. manually actuating for a second time said third input device upon the arrival of said vehicle at the point of origin of the following subroute and so on until said vehicle arrives at said ultimate destination.

4. The method of claim 3 further including the step of recording within said data processor a second plurality of sets of data different from said given plurality of sets of data, each set of said second plurality of sets of data representing a particular route within a second geographical area different from said given geographical area for enabling the routing of said motor vehicle within said second geographical area.

* * * * *